US011726396B2

(12) United States Patent
Tanaka

(10) Patent No.: US 11,726,396 B2
(45) Date of Patent: Aug. 15, 2023

(54) LIGHT SOURCE DEVICE AND PROJECTION-TYPE DISPLAY APPARATUS

(71) Applicant: Panasonic Intellectual Property Management Co., Ltd., Osaka (JP)

(72) Inventor: Takaaki Tanaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 58 days.

(21) Appl. No.: 17/538,350

(22) Filed: Nov. 30, 2021

(65) Prior Publication Data

US 2022/0091493 A1 Mar. 24, 2022

Related U.S. Application Data

(63) Continuation of application No. PCT/JP2020/029754, filed on Aug. 4, 2020.

(30) Foreign Application Priority Data

Aug. 5, 2019 (JP) ................................. 2019-143874

(51) Int. Cl.
 *G03B 21/20* (2006.01)
 *G02B 5/02* (2006.01)
 (Continued)

(52) U.S. Cl.
 CPC ......... *G03B 21/204* (2013.01); *G02B 5/0221* (2013.01); *G02B 27/1026* (2013.01);
 (Continued)

(58) Field of Classification Search
 CPC .............. G03B 21/2073; G03B 21/208; G03B 21/2066; G03B 21/2013; G03B 21/006;
 (Continued)

(56) References Cited

U.S. PATENT DOCUMENTS

| 5,313,479 A | 5/1994 | Florence |
| 2010/0238099 A1 | 9/2010 | Sumiyama |

(Continued)

FOREIGN PATENT DOCUMENTS

| JP | 6-208089 | 7/1994 |
| JP | 2010-244021 | 10/2010 |

(Continued)

OTHER PUBLICATIONS

International Search Report dated Nov. 2, 2020 in corresponding International Application No. PCT/JP2020/029754.

*Primary Examiner* — Jerry L Brooks
(74) *Attorney, Agent, or Firm* — Wenderoth, Lind & Ponack, L.L.P.

(57) ABSTRACT

A light source device includes: blue, green, and red laser light sources; a first retardation plate that controls polarization of blue laser light emitted from the blue laser light source; a polarizing beam splitter that separates the blue laser light whose polarization is controlled by the first retardation plate into a first blue laser light and a second laser light; a second retardation plate that controls polarization of the second blue laser light separated by the polarizing beam splitter; a fluorescent plate that is excited by the first blue laser light separated by the polarizing beam splitter and emits fluorescent light including a green component and a red component; a first dichroic mirror that combines the second blue laser light whose polarization is controlled by the second retardation plate and light emitted from the green and red laser light sources, to generate combined laser light; a dynamic diffuser plate that diffuses the combined laser light combined by the first dichroic mirror to generate diffused laser light; and a second dichroic mirror that combines the diffused laser light diffused by the dynamic diffuser (Continued)

plate and the fluorescent light emitted from the fluorescent plate.

13 Claims, 5 Drawing Sheets

(51) Int. Cl.
   *G02B 27/10* (2006.01)
   *G02B 27/14* (2006.01)
   *G02B 27/28* (2006.01)
   *G03B 21/00* (2006.01)

(52) U.S. Cl.
   CPC .......... *G02B 27/141* (2013.01); *G02B 27/283* (2013.01); *G03B 21/006* (2013.01); *G03B 21/208* (2013.01); *G03B 21/2013* (2013.01); *G03B 21/2066* (2013.01); *G03B 21/2073* (2013.01)

(58) Field of Classification Search
   CPC ............ G03B 21/2045; G02B 27/1026; G02B 27/141; G02B 27/283; G02B 5/0221

USPC .......................................................... 353/20
   See application file for complete search history.

(56) References Cited

U.S. PATENT DOCUMENTS

| | | |
|---|---|---|
| 2012/0140183 A1 | 6/2012 | Tanaka et al. |
| 2015/0109584 A1 | 4/2015 | Murai |
| 2018/0275496 A1 | 9/2018 | Shimizu |
| 2020/0186760 A1* | 6/2020 | Akiyama .............. H04N 9/3161 |
| 2020/0310237 A1 | 10/2020 | Akiyama et al. |

FOREIGN PATENT DOCUMENTS

| | | |
|---|---|---|
| JP | 2012-137744 | 7/2012 |
| JP | 2015-82091 | 4/2015 |
| JP | 2015-102866 | 6/2015 |
| JP | 2015-108803 | 6/2015 |
| JP | 2018-54780 | 4/2018 |
| JP | 2018-159742 | 10/2018 |
| WO | 2018/186233 | 10/2018 |

* cited by examiner

LIGHT SOURCE DEVICE AND PROJECTION-TYPE DISPLAY APPARATUS

TECHNICAL FIELD

The present disclosure relates to a light source device and a projection-type display apparatus including the light source device.

BACKGROUND ART

As a light source for a projection-type display apparatus using an image forming element such as a mirror-deflection-type digital micromirror device (DMD) or a liquid crystal panel, there are disclosed many light source devices using a solid-state light source such as a semiconductor laser or a light emitting diode, which is long life. Among them, there is disclosed a light source device having a wide color gamut and high efficiency using solid-state light sources of blue, green, and red (see PTL 1).

CITATION LIST

Patent Literature

PTL 1: Unexamined Japanese Patent Publication No. H6-208089

SUMMARY OF THE INVENTION

The present disclosure provides a light source device and a projection-type display apparatus using the light source device. In the light source device, solid-state light sources of blue, green, and red are used and speckle noise and minute luminance unevenness are eliminated, and at the same time, the light source device has a wide color gamut and is small in size.

A light source device of the present disclosure includes: a blue laser light source; a green laser light source; a red laser light source; a first retardation plate that controls polarization of blue laser light emitted from the blue laser light source; a polarizing beam splitter that separates the blue laser light whose polarization is controlled by the first retardation plate into a first blue laser light and a second laser light; a second retardation plate that controls polarization of the second blue laser light separated by the polarizing beam splitter; a fluorescent plate that is excited by the first blue laser light separated by the polarizing beam splitter and emits fluorescent light including a green component and a red component; a first dichroic mirror that combines the second blue laser light whose polarization is controlled by the second retardation plate, green laser light emitted from the green laser light source, and red laser light emitted from the red laser light source to generate combined laser light; a dynamic diffuser plate that diffuses the combined laser light combined by the first dichroic mirror to generate diffused laser light; and a second dichroic mirror that combines the diffused laser light combined by the dynamic diffuser plate and the fluorescent light emitted from the fluorescent plate.

According to the present disclosure, blue projection light and blue excitation light are obtained from the same blue laser light source by using a retardation plate and the polarizing beam splitter, it is therefore possible to downsize the blue laser light source.

DESCRIPTION OF EMBODIMENTS

Hereinafter, exemplary embodiments for carrying out the present disclosure will be described with reference to the drawings.

First Exemplary Embodiment

Figure 1:
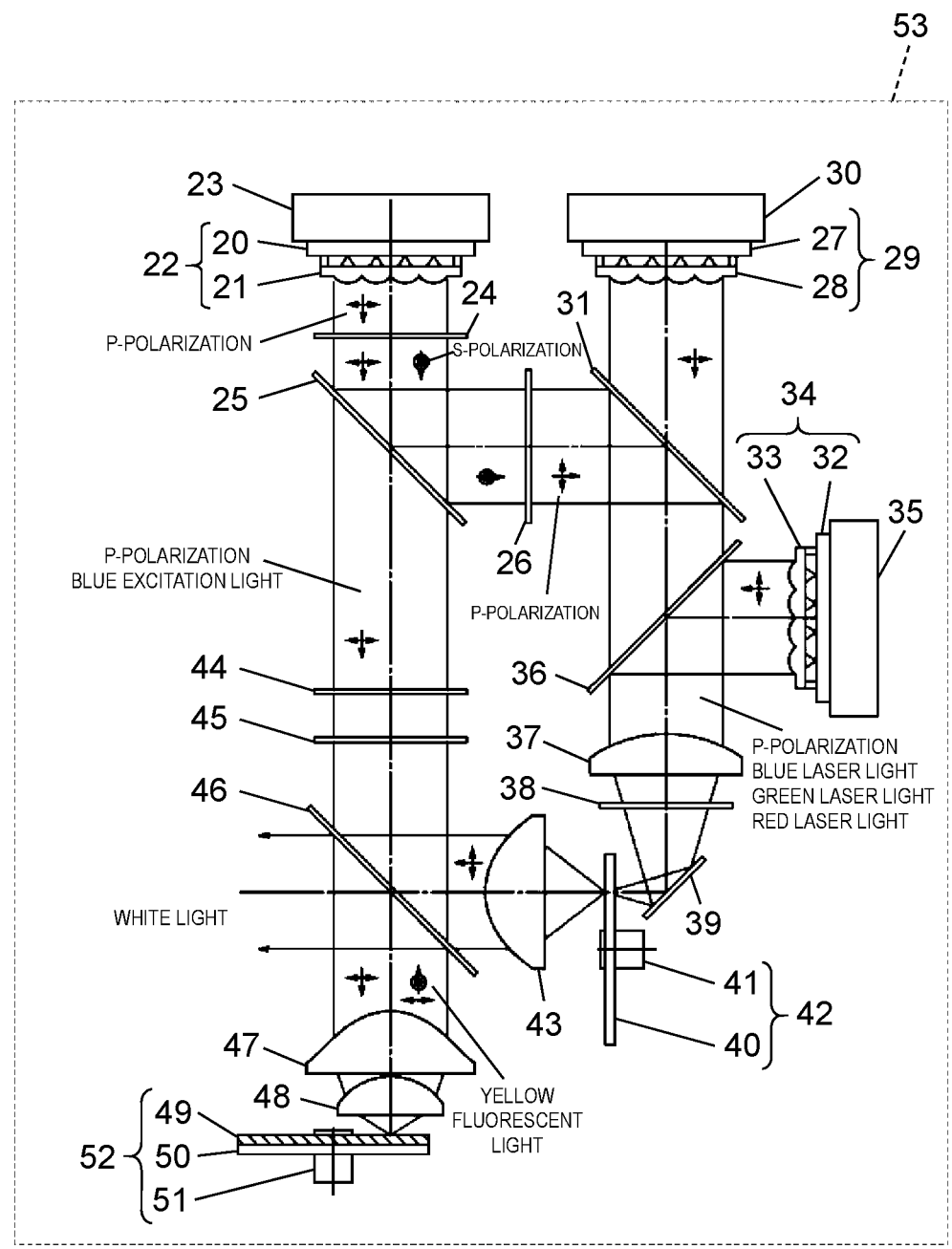
FIG. 1 is a configuration diagram of a light source device according to a first exemplary embodiment of the present disclosure.

FIG. 1 is a configuration diagram of light source device 53 according to a first exemplary embodiment of the present disclosure.

Light source device 53 includes blue laser light source 22, green laser light source 29, and red laser light source 34. Blue laser light source 22 includes collimating lens array 21 and blue semiconductor laser substrate 20 on which a plurality of blue semiconductor laser elements are arranged. Green laser light source 29 includes collimating lens array 28 and green semiconductor laser substrate 27 on which a plurality of green semiconductor laser elements are arranged. Red laser light source 34 includes collimating lens array 33 and red semiconductor laser substrate 32 on which a plurality of red semiconductor laser elements are arranged. Heat sinks 23, 30, 35 are respectively attached to blue laser light source 22, green laser light source 29, and red laser light source 34.

In addition, light source device 53 includes: first retardation plate 24 that is a half-wavelength plate; flat plate-shaped polarization beam splitter 25 that is a polarizing beam splitter; second retardation plate 26 that is a half-wavelength plate; blue-reflecting dichroic mirror 31; red-reflecting dichroic mirror 36; condenser lenses 37, 43, 47, 48; diffuser plates 38, 44; reflecting mirror 39; rotary diffuser plate 42 that is a dynamic diffuser plate including circular diffuser plate 40 and motor 41; second dichroic mirror 46; blue transmission filter 45; and fluorescent plate 52 including motor 51 and aluminum substrate 50 on which a reflection film and phosphor layer 49 are disposed.

The drawing shows: polarization directions of light emitted from the laser light sources; and polarization directions of the light that enters and is emitted from first retardation plate 24, second retardation plate 26, polarization beam splitter 25, blue-reflecting dichroic mirror 31, red-reflecting dichroic mirror 36, and second dichroic mirror 46. Specifically, in FIG. 1, the fisheye marks indicate S-polarized light, the double-headed arrow marks indicate P-polarized light, and the upward, downward, leftward, and rightward arrows shown together with the marks indicating the polarizations indicate traveling directions of the polarized light.

Blue laser light source 22 includes: blue semiconductor laser substrate 20 on which 24 (6×4) blue semiconductor laser elements are two-dimensionally arranged at regular intervals; and collimating lens array 21. Blue semiconductor laser substrate 20 generates blue color light in a wavelength band of 455±8 nm and emits linearly polarized light. The light beams emitted from blue semiconductor laser substrate 20 are individually condensed and converted into parallel light beams by corresponding collimating lens array 21. Heat sink 23 cools blue semiconductor laser substrate 20.

Green laser light source 29 includes: green semiconductor laser substrate 27 on which 24 (6×4) green semiconductor laser elements are two-dimensionally arranged at regular intervals; and collimating lens array 28. Green semiconductor laser substrate 27 generates green color light in a wavelength band of 525±8 nm and emits linearly polarized light. The light beams emitted from green semiconductor laser substrate 27 are individually condensed and converted into parallel light beams by corresponding collimating lens array 28. Heat sink 30 cools green semiconductor laser substrate 27.

Red laser light source 34 includes: red semiconductor laser substrate 32 on which 24 (6×4) red semiconductor laser elements are two-dimensionally arranged at regular intervals; and collimating lens array 33. Red semiconductor laser substrate 32 generates red color light in a wavelength band of 640±8 nm and emits linearly polarized light. The light beams emitted from red semiconductor laser substrate 32 are individually condensed and converted into parallel light beams by corresponding collimating lens array 33. Heat sink 35 cools red semiconductor laser substrate 32.

First retardation plate 24 controls polarization of blue laser light emitted from blue laser light source 22.

The blue laser light emitted from blue laser light source 22 is P-polarized and enters first retardation plate 24. First retardation plate 24 is a half-wavelength plate having a retardation of a half wavelength near a central emission wavelength of blue laser light source 22. When the P-polarization direction in the drawing is 0 degrees, first retardation plate 24 is disposed with its optical axis oriented at 15.7 degrees. On the basis of the angle of disposition of the optical axis, first retardation plate 24 converts the P-polarized light entering first retardation plate 24, into light in which the proportions of a P-polarized light component and an S-polarized light component are about 73% and about 27%. That is, the expression of "controls polarization of blue laser light" means here "to convert P-polarization blue laser light into light having a P-polarized light component and an S-polarized light component". Note that in the configuration of the present exemplary embodiment, P-polarized light is converted into light having a P-polarized light component and an S-polarized light component, but another configuration may be used in which S-polarized light is converted into light having a P-polarized light component and an S-polarized light component. First retardation plate 24 is rotationally adjustable, and the optical axis can be adjusted in the range of 0 degrees to 45 degrees inclusive when the angle of 15.7 degrees is a standard. In this case, the proportions of the P-polarized light component and the S-polarized light component can be adjusted in the range from 100% and 0% to 0% and 100% inclusive. As described above, first retardation plate 24 is controlled by a motor (not illustrated) and rotationally adjusted so as to adjust the proportions of the two orthogonal polarization components. First retardation plate 24 is a fine periodic-structured retardation plate using birefringence caused in a fine periodic structure smaller than a wavelength of light. The fine periodic-structured retardation plate is made of an inorganic material. Similar to an inorganic optical crystal such as quartz, the fine periodic-structured retardation plate has excellent durability and reliability, and is relatively low in cost. The blue laser light containing a P-polarized light component and an S-polarized light component emitted from first retardation plate 24 enters flat plate-shaped polarization beam splitter 25. In other words, the blue laser light whose polarization is controlled by first retardation plate 24 enters polarization beam splitter 25.

Polarization beam splitter 25 separates the blue laser light whose polarization is controlled by first retardation plate 24 into first blue laser light and second blue laser light. The first blue laser light here is the P-polarized light that is separated by polarization beam splitter 25, and the second blue laser light here is the S-polarized light that is separated by polarization beam splitter 25. Polarization beam splitter 25 is an optical thin film formed on a glass substrate, and allows the P-polarized light of incident blue laser light to pass through with a transmittance of 96% or more and reflects the S-polarized light of the incident blue laser light with a reflectance of 96% or more. That is, the P-polarized light emitted from first retardation plate 24 passes through polarization beam splitter 25 as the first blue laser light that is P-polarized light. The S-polarized light emitted from first retardation plate 24 is reflected by polarization beam splitter 25, as the second blue laser light that is S-polarized light.

The S-polarized blue laser light reflected by polarization beam splitter 25 enters second retardation plate 26. Second retardation plate 26 controls the polarization of the second blue laser light, which is S-polarized light and is separated by polarization beam splitter 25. Second retardation plate 26 is a half-wavelength plate having a retardation of a half wavelength near a central emission wavelength of blue laser light source 22. When the P-polarization direction in the drawing is 0 degrees, second retardation plate 26 is disposed with its optical axis oriented at 45 degrees. Second retardation plate 26 converts the S-polarized light entering second retardation plate 26 to the P-polarization direction. That is, the second retardation plate is a half-wavelength plate that converts a polarization direction. Specifically, second retardation plate 26 converts the S-polarized blue laser light reflected by polarization beam splitter 25 to the P-polarization direction.

Second retardation plate 26 is a fine periodic-structured retardation plate. The fine periodic-structured retardation plate is made of an inorganic material, has excellent durability and reliability, and is relatively low in cost. The blue laser light emitted from second retardation plate 26 enters blue-reflecting dichroic mirror 31, in the P-polarization state. That is, the second blue laser light whose polarization is controlled by second retardation plate 26 enters blue-reflecting dichroic mirror 31. Further, P-polarized green laser light emitted from green laser light source 29 enters blue-reflecting dichroic mirror 31. Blue-reflecting dichroic mirror 31 has the following characteristics. When disposed such that the incident angles are 45 degrees, blue-reflecting dichroic mirror 31 allows the green laser light to pass through with a transmittance of 94% or more and reflects the blue laser light with a reflectance of 96% or more. The half-value wavelength at which the transmittance is 50% is 490 nm for P-polarized light.

The blue laser light and the green laser light combined by blue-reflecting dichroic mirror 31 enter red-reflecting dichroic mirror 36. P-polarized red laser light emitted from red laser light source 34 enters red-reflecting dichroic mirror 36. Red-reflecting dichroic mirror 36 has the following characteristics. When disposed such that the incident angles are 45 degrees, red-reflecting dichroic mirror 36 allows the blue laser light and the green laser light to pass through with a transmittance of 94% or more and reflects the red laser light with a reflectance of 96% or more. The half-value wavelength at which the transmittance is 50% is 583 nm for P-polarized light. Here, a pair of blue-reflecting dichroic mirror 31 and red-reflecting dichroic mirror 36 is a first dichroic mirror that combines blue, green, and red laser lights.

The blue, green, and red laser lights are combined by the first dichroic mirror. That is, the first dichroic mirror combines the second blue laser light whose polarization is controlled by second retardation plate 26, the green laser light emitted from green laser light source 29, and the red laser light emitted from red laser light source 34. The blue, green, and red laser lights are condensed by condenser lens 37, and then enter diffuser plate 38. A focal length of condenser lens 37 is set such that a converging angle is 30 degrees or smaller, and a converged spot is formed near rotary diffuser plate 42. Diffuser plate 38 has a diffusion surface configured with fine microlenses formed in an array on a glass substrate, and diffuses incident light. Since the diffusion surface is made in a microlens shape, the maximum spread angle can be reduced as compared with a chemically treated diffuser plate in which a glass surface is processed to have fine irregularities by using a solution of hydrofluoric acid or the like, so that a diffusion loss can be reduced. A diffusion angle, which is a half-value angular width at which the intensity is 50% of maximum intensity of diffused light, is as small as approximately 3 degrees, and polarization characteristics are maintained. The light diffused by diffuser plate 38 is reflected by reflecting mirror 39, and then enters rotary diffuser plate 42.

Rotary diffuser plate 42 diffuses the laser light combined by the first dichroic mirror. Rotary diffuser plate 42 includes: a circular diffuser plate 40 having, on one surface of a glass substrate, a diffusion layer having fine irregularities formed in a circumferential shape; and motor 41 in the central part of rotary diffuser plate 42, and the rotation of rotary diffuser plate 42 can be rotationally controlled. The rotary diffuser plate can be rotated at a high speed up to about 10,800 rpm. As the diffusion layer of circular diffuser plate 40, a chemically treated diffuser plate whose diffusion angle is approximately 15 degrees is used, and polarization characteristics are maintained. When the chemically treated diffuser plate is employed, a large-sized diffuser plate can be manufactured at relatively low cost as compared with a diffuser plate with a microlens array. By rotating the diffusion surface, a random interference pattern on a screen caused by laser light varies temporally and spatially at a high speed, so that speckle noise is eliminated. In addition, it is possible to reduce minute luminance unevenness due to a small emission size and a number of emissions of each laser light source. The light passing through rotary diffuser plate 42 and being diffused is condensed by condenser lens 43, is converted into parallel light, and then enters second dichroic mirror 46.

On the other hand, the P-polarized blue laser light passing through polarization beam splitter 25 enters diffuser plate 44. Diffuser plate 44 has a diffusion surface configured with fine microlenses formed on a glass substrate in an array, has a small diffusion angle of approximately 3 degrees, and maintains polarization characteristics. The light diffused by diffuser plate 44 enters blue transmission filter 45. Blue transmission filter 45 has the following characteristics. When disposed such that the incident angle is 0 degrees, the blue transmission filter 45 has a half-value wavelength of 480 nm, at which the transmittance is 50%, allows the light in a wavelength band of the blue laser light to pass through with a transmittance of 96% or more, and reflect the light in the other wavelength band with a reflectance of 98% or more. The P-polarized blue laser light passing through blue transmission filter 45 enters second dichroic mirror 46.

Figure 2:
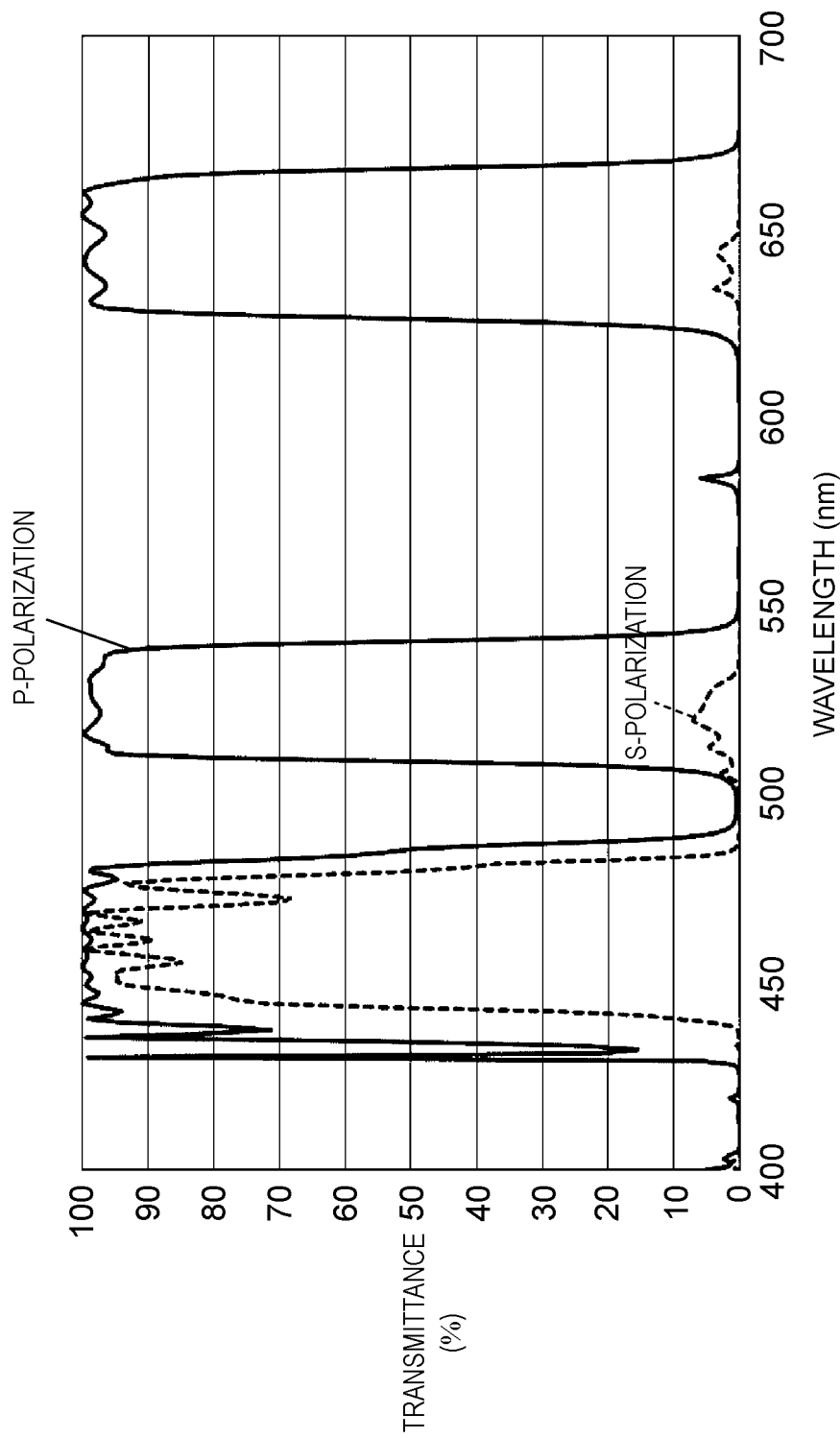
FIG. 2 is a diagram illustrating spectral transmittance characteristics of a second dichroic mirror according to the first exemplary embodiment.

FIG. 2 shows spectral transmittance characteristics of second dichroic mirror 46. FIG. 2 illustrates spectral transmittance characteristics of P-polarized light and S-polarized light of second dichroic mirror 46. Second dichroic mirror 46 has characteristics that the transmittance of P-polarized light is 90% or more for each of the wavelength bands of the blue laser light, the green laser light, and the red laser light. In addition, second dichroic mirror 46 has characteristics that the transmittance is 10% or less for the S-polarized light in a wavelength band of 485 nm to 700 nm including each of the wavelength bands of the green laser light and the red laser light. In other words, second dichroic mirror 46 has the following characteristics. Each of the blue, green, and red laser lights of P-polarization passes through with a transmittance of 90% or more, each of the green and red laser lights of S-polarization are reflected with a reflectance of 90% or more, and fluorescent light outside the wavelength bands of the blue, green, and red laser lights is reflected. The characteristics of FIG. 2 are an example designed by alternately forming, on a glass substrate, 89 layers of optical thin films of high refractive index material such as $TiO_2$ and a low refractive material such as $SiO_2$.

Each of the blue, green, and red laser lights entering second dichroic mirror 46 from condenser lens 43 is P-polarized light, and passes through second dichroic mirror 46 with a transmittance of 90% or more. Each laser light passing through second dichroic mirror 46 is emitted from light source device 53 to become effective light.

The blue laser light entering second dichroic mirror 46 from blue transmission filter 45 is P-polarized light, and passes through second dichroic mirror 46 with a transmittance of 90% or more. The blue laser light of P-polarization passing through second dichroic mirror 46 enters fluorescent plate 52 while being condensed by condenser lenses 47, 48 and superposed to make a spot light with a spot diameter of 2 mm to 3 mm when the spot diameter is defined by a diameter at which light intensity is 13.5% of a peak intensity to enter fluorescent plate 52. Diffuser plate 44 diffuses the light such that the diameter of the spot light is a desired diameter.

Fluorescent plate 52 is a rotation-controllable circular substrate including: aluminum substrate 50 on which a reflection film and phosphor layer 49 are formed; and motor 51 in the central part. The reflection film of fluorescent plate 52 is a metal film or a dielectric film that reflects visible light, and reflection film of fluorescent plate 52 is formed on aluminum substrate 50. Further, phosphor layer 49 is formed on the reflection film.

Phosphor layer 49 is made of a Ce:YAG based yellow phosphor that is excited by blue light and emits yellow light containing green and red components. A typical chemical composition of a crystalline matrix of this fluorescent material is $Y_3Al_5O_{12}$. Phosphor layer 49 is formed in an annular shape. When excited by the spot light, phosphor layer 49 emits yellow light containing green and red components. Fluorescent plate 52 has aluminum substrate 50 and is rotated. The rotation reduces a temperature rise of phosphor layer 49 caused by blue laser light that is the excitation light, thereby stably maintaining fluorescence conversion efficiency. The blue laser light entering phosphor layer 49 excites phosphor layer 49. Excited phosphor layer 49 generates a color light including green and red components. Then, the color light including the green and red components is emitted from fluorescent plate 52. Further, the light generated toward a reflection film side is reflected by the reflection film and is emitted from fluorescent plate 52. The color light emitted from fluorescent plate 52 and including the green and red components becomes randomly polarized light, is condensed again and converted into approximately parallel light by condenser lenses 47, 48, and then enters second dichroic mirror 46. Here, the color light including the green and red components is referred to as a fluorescent light.

Figure 3:
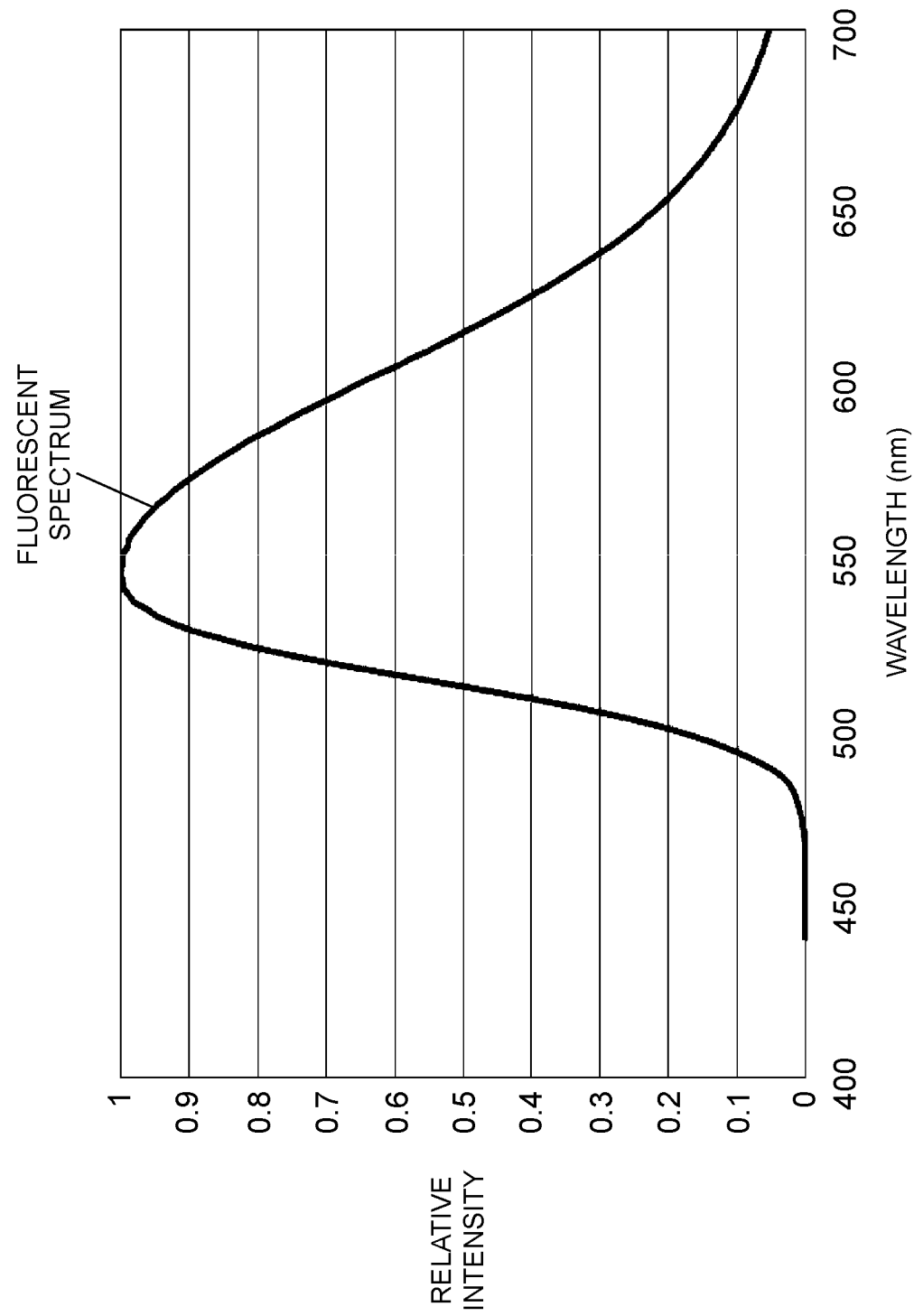
FIG. 3 is a diagram showing emission spectrum characteristics of fluorescent light.

FIG. 3 is a diagram showing fluorescence spectrum characteristics of the fluorescent light. FIG. 3 illustrates a relative light intensity of the fluorescent light with respect to the wavelength. The fluorescent light is yellow light having a peak at 544 nm.

The P-polarized light component of the fluorescent light entering second dichroic mirror 46 passes through second dichroic mirror 46 with a transmittance of 90% or more in each of the wavelength bands of the green laser light and the red laser light, but the light in the other wavelength band is reflected with a reflectance of 90% or more. The S-polarized light component of the fluorescent light entering second dichroic mirror 46 is reflected with a reflectance of 90% or more. The fluorescent light reflected by second dichroic mirror 46 is emitted from light source device 53 to become effective light.

The P-polarized light component of the fluorescent light passing through second dichroic mirror 46 is reflected by blue transmission filter 45, passes again through second dichroic mirror 46, and is condensed on fluorescent plate 52 by condenser lenses 47, 48. The fluorescent light of P-polarization entering fluorescent plate 52 is scattered by phosphor layer 49 and reflection layer; therefore, the fluorescent light becomes randomly polarized light and is emitted from fluorescent plate 52. The fluorescent light emitted from fluorescent plate 52 is condensed by condenser lenses 47, 48, and then enters second dichroic mirror 46, and the P-polarized light component of each of the wavelength bands of the green laser light and the red laser light passes through second dichroic mirror 46, and the S-polarized light component of each wavelength band is reflected. In this manner, part of the fluorescent light of the P-polarized light component passing through second dichroic mirror 46 is reflected by blue transmission filter 45 and is converted into randomly polarized light by the fluorescent plate 52. Therefore, the light that passes through second dichroic mirror 46 and would be lost can be converted into effective light that is reflected by second dichroic mirror 46. Due to repeated reflection between blue transmission filter 45 and fluorescent plate 52, part of the P-polarized fluorescent light is converted into effective S-polarized fluorescent light. In this case, a light flux emitted from the light source device is improved by about 8% as compared with the case where blue transmission filter 45 is not disposed.

The blue, green, and red laser lights and the fluorescent light are combined on the same optical axis by second dichroic mirror 46 and blue transmission filter 45 with an efficiency of 90% or more for the laser light and with an efficiency about 93% for the fluorescent light with respect to fluorescent spectrum, and as a result, white light is emitted. The light flux of the blue, green, and red laser lights emitted from light source device 53 and the light flux of the fluorescent light are made substantially equal to each other. In this case, the color gamut roughly encompasses the color gamut standard DCI (Digital Cinema Initiatives).

By controlling the light output of each laser light source by a drive current and by controlling the blue excitation light intensity by adjusting the inclination of the optical axis of first retardation plate 24, it is possible to control the intensity proportions of the laser light and the fluorescent light and to control the white balance. Therefore, it is possible to adjust the color gamut from the color gamut standard Rec709 in the case of reducing the output of the green and red laser lights, to the color gamut standard DCI in the case of equalizing the light flux of the laser lights and the light flux of the fluorescent light, and to the color gamut standard Rec2020 in the case of reducing the output of the fluorescent light.

The blue, green, and red laser lights emitted from second dichroic mirror 46 are combined with the fluorescent light having no speckle noise. Therefore, the light emitted from light source device 53 is light which has a wide color gamut and in which speckle noise is eliminated.

In the described configuration of each of the green laser light source, the red laser light source, and the blue laser light source, 24 semiconductor laser elements are arranged; however, the laser light sources may be configured with more semiconductor laser elements for higher luminance.

The first retardation plate may be a quarter-wavelength plate in the case where the control ratio between the P-polarized light component and the S-polarized light component may be in the range from 100% and 0% to 50% and 50% inclusive.

As the dynamic diffuser plate, the rotary diffuser plate is described, but it is possible to use a moving diffuser plate whose diffusion surface is moved.

As described above, in the light source device of the present disclosure, since the blue projection light and the blue laser excitation light whose intensities can be controlled are obtained from the same blue laser light source by using the retardation plate and the polarizing beam splitter, it is possible to downsize the blue laser light source. In addition, color gamut adjustment can be performed by dimming with the laser light sources and the retardation plate. Further, the second dichroic mirror efficiently combines, on the same optical axis, the light of blue, green, and red laser light sources and fluorescent light having no speckle noise. Therefore, a small-sized light source device can be configured which has a wide and adjustable color gamut and in which speckle noise and minute luminance unevenness are eliminated.

Second Exemplary Embodiment

Figure 4:
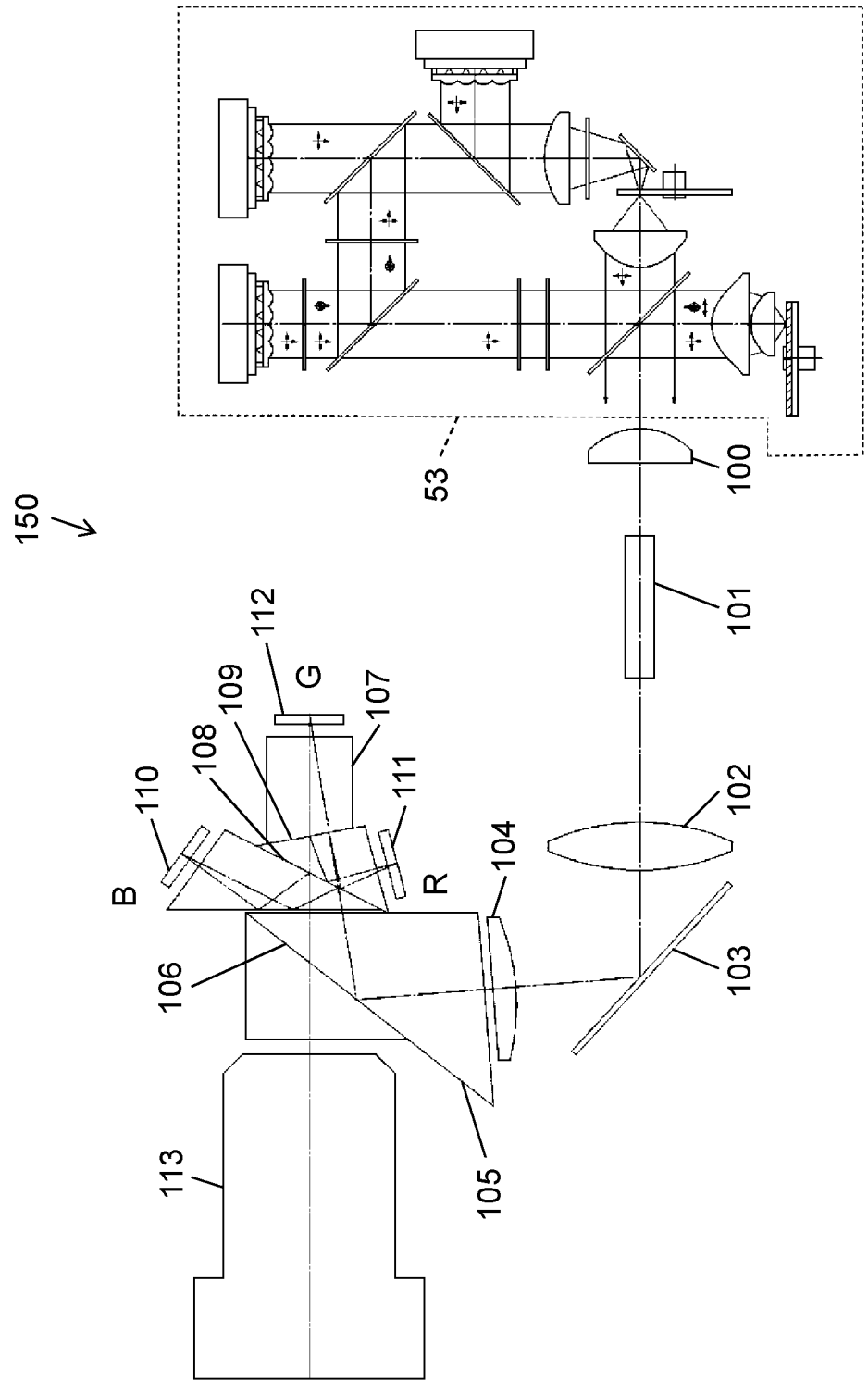
FIG. 4 is a configuration diagram of a projection-type display apparatus according to a second exemplary embodiment of the present disclosure.

FIG. 4 illustrates first projection-type display apparatus 150 according to a second exemplary embodiment of the present disclosure. First projection-type display apparatus 150 uses three display digital micromirror devices (DMDs) as an image former. A light source device of first projection-type display apparatus 150 is light source device 53 described in the first exemplary embodiment of the present disclosure. First projection-type display apparatus 150 includes condenser lens 100, rod 101, relay lens 102, reflecting mirror 103, field lens 104, total reflection prism 105, air layer 106, color prism 107 including three prisms provided with blue-reflecting dichroic mirror 108 and red-reflecting dichroic mirror 109, DMDs 110, 111, 112, and projection lens 113. Here, DMDs 110, 111, 112 are each an example of a pixel forming element.

The combined light containing the laser light and the fluorescent light emitted from light source device 53 is condensed on rod 101 by condenser lens 100. The light entering rod 101 is reflected a plurality of times inside the rod so that the light intensity is homogenized, and is then emitted from rod 101. The light emitted from rod 101 is condensed by relay lens 102, is reflected by reflecting mirror 103, passes through field lens 104, and enters total reflection prism 105. Total reflection prism 105 includes two prisms, and thin air layer 106 is formed between surfaces of the prisms close to each other. Air layer 106 totally reflects light entering at an angle greater than or equal to a critical angle. The light passing through field lens 104 is reflected by a total reflection surface of total reflection prism 105 and enters color prism 107. Color prism 107 is configured with three prisms, and blue-reflecting dichroic mirror 108 and red-reflecting dichroic mirror 109 are formed on surfaces on which the prisms are adjacent to each other. Light entering color prism 107 is separated into color lights of blue, red, and green by blue-reflecting dichroic mirror 108 and red-reflecting dichroic mirror 109 of color prism 107, and the blue, red, and green color lights respectively enter DMDs 110, 111, 112. DMDs 110, 111, 112 each deflect micromirrors in accordance with a video signal and reflects the light as the two lights: the light entering projection lens 113; and the light traveling outside an effective area of projection lens 113. That is, DMDs 110, 111, 112 are each an image forming element that forms an image in accordance with a video signal. In each of DMDs 110, 111, 112, a region on which the micromirrors are arranged and which reflects light is an example of an area to be illuminated. Condenser lens 100, rod 101, relay lens 102, reflecting mirror 103, and field lens 104 are an example of an illumination optical system that condenses the light emitted from the light source device and illuminates the area to be illuminated.

The light reflected by DMDs 110, 111, 112 passes through color prism 107 again. In the course of passing through color prism 107, the separated blue color light, red color light, and green color light are combined and enter total reflection prism 105. Because the light entering total reflection prism 105 enters air layer 106 at the critical angle or less, the light passes through air layer 106 to enter projection lens 113. In this manner, image light formed by DMDs 110, 111, 112 is enlarged and projected on a screen (not illustrated).

The light flux from the blue, green, and red laser light sources and the light flux from the fluorescent plate are made approximately equal to each other. The color gamut roughly encompasses the color gamut standard DCI.

By controlling the light output of each laser light source by means of a drive current and by controlling the excitation light intensity by adjusting the inclination of the optical axis of first retardation plate 24, it is possible to control the intensity proportions of the laser light and the fluorescence and to control the white balance. Therefore, it is possible to adjust the color gamut from the color gamut standard Rec709 in the case of reducing the output of the green and red laser lights, to the color gamut standard DCI in the case of equalizing the light flux of the laser lights and the light flux of the fluorescent light, and to the color gamut standard Rec2020 in the case of reducing the output of the fluorescent light.

Since DMDs are used for an image former, a projection-type display apparatus can be configured which has higher light resistance and heat resistance as compared with an apparatus provided with an image former using liquid crystal. Further, since three DMDs are used, a bright and high-definition projection image with good color reproduction can be obtained.

As described above, first projection-type display apparatus 150 of the present disclosure uses light source device 53 according to the first exemplary embodiment of the present disclosure. Therefore, a small-sized projection-type display apparatus can be configured which has a wide and adjustable color gamut and in which speckle noise and minute luminance unevenness are eliminated.

Third Exemplary Embodiment

Figure 5:
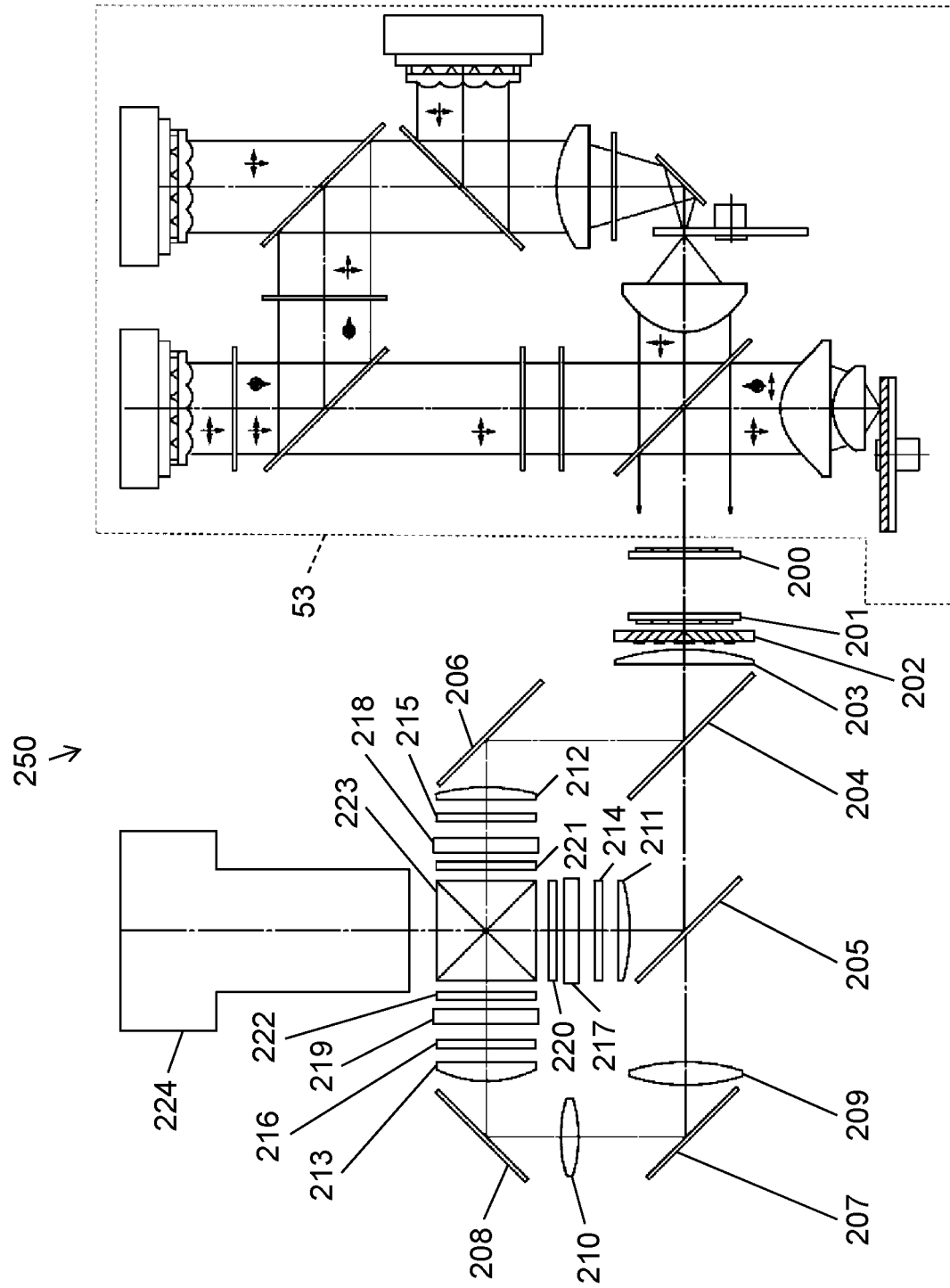
FIG. 5 is a configuration diagram of a projection-type display apparatus according to a third exemplary embodiment of the present disclosure.

FIG. 5 illustrates second projection-type display apparatus 250 according to a third exemplary embodiment of the present disclosure. Second projection-type display apparatus 250 uses, as an image former, an active matrix-type transmissive liquid crystal panel of a TN mode or a VA mode in which thin film transistors are formed in a pixel area. The light source device of second projection-type display apparatus 250 is light source device 53 described in the first exemplary embodiment of the present disclosure. Second projection-type display apparatus 250 includes first lens array plate 200, second lens array plate 201, polarization conversion element 202, superposition lens 203, blue-reflecting dichroic mirror 204, green-reflecting dichroic mirror 205, reflecting mirrors 206, 207, 208, relay lenses 209, 210, field lenses 211, 212, 213, incidence-side polarizing plates 214, 215, 216, liquid crystal panels 217, 218, 219, exit-side polarizing plates 220, 221, 222, color-combining prism 223 configured with a red-reflecting dichroic mirror and a blue-reflecting dichroic mirror, and projection lens 224. Here, the pixel area of the liquid crystal panel is an example of an area to be illuminated, and first lens array plate 200, second lens array plate 201, polarization conversion element 202, and superposition lens 203 are an example of an illumination optical system that condenses the light emitted from light source device 53 and illuminates the area to be illuminated.

The combined light of the laser light and the fluorescent light emitted from light source device 53 enters first lens array plate 200 including a plurality of lens elements. The light flux of the combined light entering first lens array plate 200 is divided into a large number of light fluxes. The large number of divided light fluxes are converged on second lens array plate 201 including a plurality of lenses. The lens elements of first lens array plate 200 have an aperture shape similar to the aperture shape of liquid crystal panels 217, 218, 219. Regarding the lens elements of second lens array plate 201, the focal length is determined such that first lens array plate 200 and liquid crystal panels 217, 218, 219 are in an approximate conjugate relation. The divided light beams emitted from second lens array plate 201 enter polarization conversion element 202. Polarization conversion element 202 includes a polarization separation prism and a half-wavelength plate. Polarization conversion element 202 converts the incident P-polarized light and randomly polarized light into S-polarized light, and allows the incident S-polarized light to exit as S-polarized light. The light emitted from polarization conversion element 202 enters superposition lens 203. Superposition lens 203 superposes the light emitted from each of lens element of second lens array plate 201 on liquid crystal panels 217, 218, 219 to illuminate. First lens array plate 200, second lens array plate 201, and superposition lens 203 are used as an illumination optical system. The light emitted from superposition lens 203 is separated into blue, green, and red color lights by blue-reflecting dichroic mirror 204 and green-reflecting dichroic mirror 205 that serve as a color separator. The green color light passes through field lens 211 and incidence-side polarizing plate 214, and then enters liquid crystal panel 217. The blue color light is reflected by reflecting mirror 206, and then passes through field lens 212 and incidence-side polarizing plate 215, and enters liquid crystal panel 218. After passing through relay lenses 209, 210 and being reflected by reflecting mirrors 207, 208, the red color light passes through field lens 213 and incidence-side polarizing plate 216, and then enters liquid crystal panel 219. Three liquid crystal panels 217, 218, 219 each change the polarization state of incident light by controlling voltages applied to the pixels, depending on a video signal. Further, the light is modulated by combining incidence-side polarizing plates 214, 215, 216 and exit-side polarizing plates 220, 221, 222 respectively disposed on both sides of liquid crystal panels 217, 218, 219 such that transmission axes are orthogonal to each other between the both sides, so that green, blue, and red images are formed. Regarding the color lights passing through exit-side polarizing plates 220, 221, 222, color-combining prism 223 causes the red light and the blue light to be reflected respectively by a red-reflecting dichroic mirror and a blue-reflecting dichroic mirror, and the red color light and the blue color light are combined with the green color light, and then, the combined light enters projection lens 224. The light entering projection lens 224 (an image formed by the liquid crystal panels) is enlarged and projected on a screen (not illustrated).

The light fluxes emitted from the blue, green, and red laser light sources and the light flux emitted from the fluorescent plate are made approximately equal to each other. The color gamut roughly encompasses the color gamut standard DCI.

By controlling the light output of each laser light source by means of a drive current and by controlling the excitation light intensity by adjusting the inclination of the optical axis of first retardation plate 24, it is possible to control the intensity proportions of the laser light and the fluorescence and to control the white balance. Therefore, it is possible to adjust the color gamut from the color gamut standard Rec709 in the case of reducing the output of the green and red laser lights, to the color gamut standard DCI in the case of equalizing the light flux of the laser lights and the light flux of the fluorescent light, and to the color gamut standard Rec2020 in the case of reducing the output of the fluorescent light.

As the image former, three liquid crystal panels using polarization are used instead of the time-division system, it is possible to obtain a bright and high-definition projection image with excellent color reproduction without color breaking. In addition, because a total reflection prism is not necessary, a small prism having a 45 degrees incident angle can be used as the color-combining prism, so that the projection-type display apparatus can be downsized as compared with an apparatus using three DMD elements.

As described above, second projection-type display apparatus 250 of the present disclosure uses light source device 53 according to the first exemplary embodiment of the present disclosure. Therefore, a small-sized projection-type display apparatus can be configured which has a wide and adjustable color gamut and in which speckle noise and minute luminance unevenness are eliminated.

Although transmissive liquid crystal panels are used as the image former, reflective liquid crystal panels may be used. By using reflective liquid crystal panels, a more small-sized and higher-definition projection-type display apparatus can be configured.

INDUSTRIAL APPLICABILITY

The present disclosure relates to a light source device for a projection-type display apparatus using an image former.

The invention claimed is:

1. A light source device comprising:
a blue laser light source;
a green laser light source;
a red laser light source;
a first retardation plate that controls polarization of blue laser light emitted from the blue laser light source;
a polarizing beam splitter that separates the blue laser light whose polarization is controlled by the first retardation plate into a first blue laser light and a second blue laser light;
a second retardation plate that controls polarization of the second blue laser light separated by the polarizing beam splitter;
a fluorescent plate that is excited by the first blue laser light separated by the polarizing beam splitter and emits fluorescent light including a green component and a red component;
a first dichroic mirror that combines the second blue laser light whose polarization is controlled by the second retardation plate, green laser light emitted from the green laser light source, and red laser light emitted from the red laser light source, to generate combined laser light;
a dynamic diffuser plate that diffuses the combined laser light combined by the first dichroic mirror to generate diffused laser light; and
a second dichroic mirror that combines the diffused laser light diffused by the dynamic diffuser plate and the fluorescent light emitted from the fluorescent plate.

2. The light source device according to claim 1, wherein the first retardation plate is a half-wavelength plate.

3. The light source device according to claim 1, wherein the first retardation plate is rotationally adjusted to adjust a ratio between two polarization components orthogonal to each other.

4. The light source device according to claim 1, wherein the polarizing beam splitter is a flat plate-shaped polarization beam splitter.

5. The light source device according to claim 1, wherein the second retardation plate is a half-wavelength plate that converts a polarization direction.

6. The light source device according to claim 1, wherein the dynamic diffuser plate is a rotary diffuser plate that includes:
a circular diffuser plate including a glass substrate, a surface of the glass substrate having fine irregularities formed in a circumferential shape; and
a motor.

7. The light source device according to claim 1, wherein the fluorescent plate is a rotation-controllable circular substrate, and includes a phosphor layer formed of a Ce:YAG based yellow phosphor.

8. The light source device according to claim 1, wherein the second dichroic mirror allows the blue laser light, the green laser light, and the red laser light that are P-polarized to pass through with a transmittance of 90% or more, reflects the green laser light and the red laser light that are S-polarized with a reflectance of 90% or more, and reflects the fluorescent light outside wavelength bands of the blue laser light, the green laser light, and the red laser light.

9. The light source device according to claim 1, further comprising, between the polarizing beam splitter and the second dichroic mirror, a blue transmission filter that allows the blue laser light to pass through and reflects the fluorescent light.

10. The light source device according to claim 1, wherein the blue laser light source, the green laser light source, and the red laser light source are semiconductor lasers.

11. A projection-type display apparatus comprising:
a light source;
an illumination optical system that condenses light emitted from the light source and illuminates an area to be illuminated;
an image forming element that forms an image, based on a video signal; and a projection lens that enlarges and projects the image formed by the image forming element, wherein the light source is the light source device according to claim 1.

12. The projection-type display apparatus according to claim 11, wherein the image forming element is a liquid crystal panel.

13. The projection-type display apparatus according to claim 11, wherein the image forming element is a mirror-deflection-type digital micromirror device (DMD).

* * * * *